(No Model.)
R. VARLEY, Jr.
ELECTRO MAGNET.
No. 489,277. Patented Jan. 3, 1893.
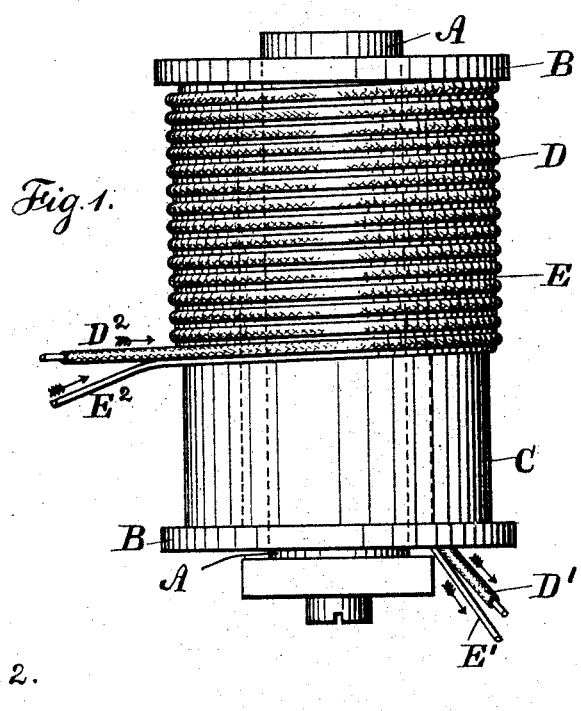
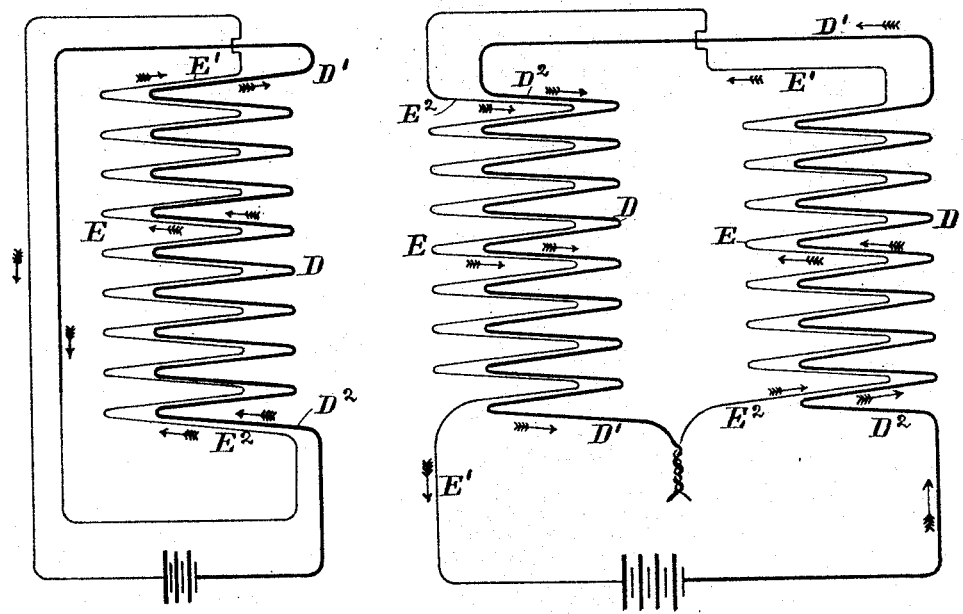
Witnesses:
J. Stait
Chas. A. Smith
Inventor:
Richard Varley Jr.
per Lemuel W. Serrell
Atty.

UNITED STATES PATENT OFFICE.

RICHARD VARLEY, JR., OF ENGLEWOOD, NEW JERSEY.

ELECTRO-MAGNET.

SPECIFICATION forming part of Letters Patent No. 489,277, dated January 3, 1893.

Application filed June 13, 1892. Serial No. 436,472. (No model.)

*To all whom it may concern:*

Be it known that I, RICHARD VARLEY, Jr., a citizen of the United States, residing at Englewood, in the county of Bergen and State of New Jersey, have invented an Improvement in Electro-Magnets, of which the following is a specification.

In the manufacture of electro-magnets it has heretofore been usual to employ wire with a covering of silk or other material to insulate the same, and to wind the wire around the core, and in the compound winding of magnets and induction coils two wires have in some instances been wound together.

My present invention is adapted to any character of electro-magnet, but it is advantageously applied to the cheaper kinds of magnets employed in call bells, spark coils and alarms.

By my present improvements I am enabled to lessen the expense of the magnet and to introduce the same number of coils and convolutions into a smaller space, or to increase the number of convolutions without increasing the size of the magnet, thereby promoting the efficiency of the same.

In carrying out my invention I use two wires, one a wire covered with insulating material, such as a winding of silk or other fibrous material, and the other wire a plain or naked wire, and these two are wound side by side, and the layers of coils or helices are insulated from each other by paper or similar material, and in consequence of the convolutions of the covered wire alternating with the convolutions of the plain wire, the plain wire is kept from contact, the one convolution with the other, and much less space is required because the space occupied by the covering of one wire is dispensed with. The ends of the helices are connected up in series, so that the current traverses both the coils in the same direction, thereby obtaining the greatest magnetic efficiency from a given current.

In the drawings Figure 1 is an elevation of my improved magnet partially wound. Fig. 2 is a diagram illustrating the manner of winding and of connecting the respective helices of one core, and Fig. 3 is a similar diagram showing the connections of the wires for two cores.

Upon the core A is any suitable spool having heads B B and a suitable insulating tube between the metal of the core and the first coil of the wire, and a complete layer of paper C is to be applied around each layer as coiled up in succession, so as to insulate one layer from the other. The wire D is covered with insulating material such as silk or other fiber braided or twisted thereon, and the wire E is plain, and these wires are wound parallel and simultaneously, so that the coils of the plain wire E intervene between the coils of the covered wire D, and the winding is to be continued in layers, with the insulation of paper or other material between, until the spool or helix of the proper size is completed, care being taken to allow the inner ends D' and E' to project, and after the helix or spool is completed, the two coils or helices are connected in series by joining the ends $E^2$ and D', so that the current will pass in by $D^2$ and through the covered helix D, thence by the end D' to the end $E^2$ and through the helix E of plain wire and away by the end E' to the negative of the generator, thus obtaining great efficiency in the magnet and reducing the expense and the size of the helix and causing the current to pass through both helices in the same direction to obtain the greatest magnetic efficiency.

I remark that while I find it advantageous to employ one covered and one naked wire, the connections of two wire helices in series as aforesaid might be effected even in instances where both wires were covered.

Where an electro-magnet is composed of two cores and two helices, as in Fig. 3, the outgoing ends E' D' of one helix will be joined to the ingoing ends $E^2 D^2$ of the next helix, and at the other end, the wires D' $E^2$ will be connected and the wires E' and $D^2$ will form the electrodes or pass to the battery or other source of electric energy.

In many characters of electro-magnets the principal expense is in the insulation of the wire, because the covered wire is so much more expensive than the same wire uncovered; for this reason I am enabled to lessen the expense to a very large extent because only half the amount of covered wire is required in obtaining the same magnetic potential.

I claim as my invention.

1. The combination in an electro-magnet of the helix composed of two parallel wound wires, one being covered, and the other uncovered, and one layer of wire insulated from the next layer of wire, substantially as set forth.

2. An electro-magnet having a helix of two parallel wires, one with a fibrous covering and the other without a fibrous covering, and wound in layers insulated one from the other, substantially as set forth.

3. An electro-magnet having a helix of two similarly sized parallel wires, one with a fibrous covering and the other without a fibrous covering and wound in layers, insulated one from the other, substantially as set forth.

4. An electro-magnet having a helix of two parallel wires, one with a fibrous covering and the other without a fibrous covering and wound in layers, insulated one from the other, and the ends of the respective helices connected directly together, substantially as set forth.

Signed by me this 9th day of June, 1892.

RICHARD VARLEY, JR.

Witnesses:
GEO. T. PINCKNEY,
WILLIAM G. MOTT.